United States Patent [19]

Kytta

[11] 4,086,842
[45] May 2, 1978

[54] INTERNAL FORCE MULTIPLIER FOR A SERVOMOTOR

[75] Inventor: Oswald Oscar Kytta, South Bend, Ind.

[73] Assignee: The Bendix Corporation, South Bend, Ind.

[21] Appl. No.: 736,665

[22] Filed: Oct. 28, 1976

[51] Int. Cl.² ........................... F15B 9/10; F15B 13/10
[52] U.S. Cl. ................. 91/369 A; 91/376 R; 91/391 R; 92/140
[58] Field of Search .................. 91/391 A, 391 R; 92/140, 369 A, 376 R

[56] References Cited

U.S. PATENT DOCUMENTS

| | | | |
|---|---|---|---|
| 2,089,173 | 8/1937 | Brown et al. | 92/140 |
| 2,134,227 | 10/1938 | Forkardt | 92/140 |
| 2,395,223 | 2/1946 | Ingres | 92/140 |
| 2,651,207 | 9/1953 | Olson | 92/140 |
| 3,237,525 | 3/1966 | Stelzer | 91/369 A |

FOREIGN PATENT DOCUMENTS 2,232,709  7/1972  Germany .................. 92/140

*Primary Examiner*—Paul E. Maslousky
*Attorney, Agent, or Firm*—Leo H. McCormick, Jr.; Ken C. Decker

[57] ABSTRACT

A lever arrangement for providing a servomotor in a power braking system with a variable operational output force. The servomotor has a wall moved by a pressure differential to create an initial output force. The lever arrangement is attached to the servomotor and modifies the initial output force from the wall to create the variable operational output force which is supplied to a master cylinder.

2 Claims, 4 Drawing Figures

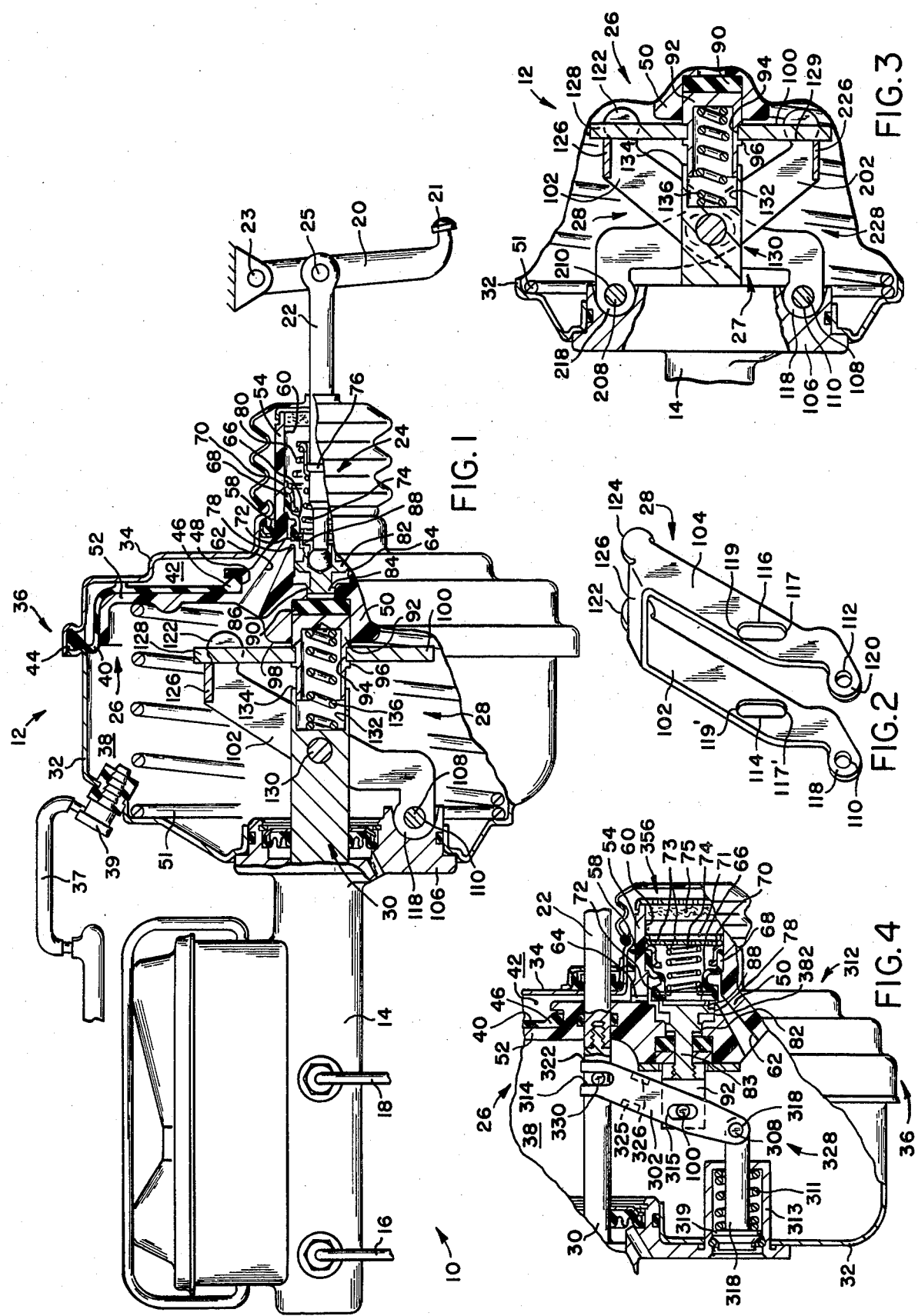

INTERNAL FORCE MULTIPLIER FOR A SERVOMOTOR

BACKGROUND OF THE INVENTION

This invention relates to a servomotor having a lever arrangement for multiplying the output force created by movement of a wall. The wall is moved by a pressure differential created thereacross through the operation of a control valve by an operator input force.

Pressure differentially operated servomotors are commonly used to operate master cylinders used in automotive brake systems. Since servomotors are at times inoperative, it is necessary that the vehicle operator be able to manually actuate the master cylinder by operation of the brake pedal. In order to bring a vehicle to a stop within the stopping limits proposed by the U.S. Department of Transportation, it is necessary for the brake pedal to have a mechanical advantage of about 5:1, such as that disclosed in U.S. Pat. No. 3,486,386 to provide the relatively high mechanical advantage. Unfortunately, such a brake pedal arrangement will not fit in some vehicles because of a lack of space between the firewall and dash.

SUMMARY OF THE INVENTION

In order to reduce the overall size of a pressure differentially operated servomotor and master cylinder assembly while at the same time using the same brake pedal lever arrangement as that used by the prior art, I discovered that the overall size of the servomotor could be reduced by modifying the output of the movable power wall used in the servomotor through a lever arrangement. The lever arrangement in a first embodiment of my invention includes first and second arm members each of which have a first end pivotally attached to the housing of the servomotor and a second end connected to the movable wall. The first and second arm members each have a slot located thereon for retaining a first pivot pin on the output push rod of the servomotor. Movement of the movable wall by a pressure differential force causes the first and second arm members to rotate about the first end and transmit an operational force into the output push rod through engagement of the first pivot pin. Depending upon the ratio of the distance between the first and second ends and the first end and the slots in the first and second arm members it is possible to multiply the output force of the movable wall. For instance, if the servomotor size is sufficient to provide the master cylinder with an adequate operational input force, a servomotor having a diameter of about ½ that size equipped with the lever arrangement would suffice for such a use. Additionally, if a servomotor is insufficient to adequately operate a brake system, a servomotor equipped with a lever arrangement can about double the output force supplied the master cylinder and thereby safely operate the brake system.

In a second servomotor embodiment of my invention, the lever arrangement includes a scissors-like arm member for supplying the pivot pin on the output push rod with a substantially axial input force.

In a third servomotor embodiment of my invention, the lever arrangement includes a spring which holds the end of the lever arrangement against the housing of the servomotor during movement of the movable wall by the pressure differential and in the absence of a pressure differential allows a predetermined input force to be directly transmitted to the master cylinder without movement of the movable wall.

It is the object of this invention to provide a power brake servomotor with a lever arrangement for modifying the output of the servomotor to provide a master cylinder with an operational force sufficient to meet a braking requirement.

It is another object of this invention to provide a servomotor with a lever arrangement for modifying the output force of the servomotor which actuates a hydraulic mechanism.

It is another object of this invention to provide a servomotor with a lever arrangement which allows a predetermined input force to be directly transmitted to an output push rod without movement of an output force producing wall in the absence of the development of an operational pressure differential in the servomotor.

These and other objects will become apparent from reading this specification and viewing the drawings.

BRIEF DESCRIPTION OF THE DRAWINGS

FIG. 1 is a sectional view of a power brake servomotor having an internal lever arrangement made according to my invention for transmitting an operational force to an attached master cylinder in a brake system;

FIG. 2 is a perspective view of the lever arrangement of FIG. 1;

FIG. 3 is a second embodiment of the power brake servomotor illustrated in FIG. 1 having a scissors-like lever arrangement for transmitting the operational force into a master cylinder; and FIG. 4 is a third embodiment of a power brake servomotor for use in a brake system having a lever arrangement made according to my invention which permits independent movement of an output push rod by an input force without movement of a pressure differential responsive wall in the servomotor.

DETAILED DESCRIPTION OF THE INVENTION

The brake system 10 shown in FIG. 1, has a pedal 20 connected to a push rod 22 for imparting an operational input to servomotor 12. The servomotor 12 is connected to a master cylinder 14 which in turn is connected to the wheel brakes of a vehicle through conduits 16 and 18. In response to an operator input force applied to pedal 20, a control valve 24 is actuated to allow a pressure differential to be created across wall 26 in the servomotor 12. The pressure differential moves the wall 26 and creates an output force. The output force from the wall 26 is communicated through a lever arrangement 28 into an output push rod 30 which supplies the master cylinder 14 with an operational input.

In more particular detail, the servomotor 12 has a housing formed of front shell 32 connected to a rear shell 34 through a twist lock arrangement 36. The interior of the housing is divided by a diaphragm 40 of the wall 26 into a first chamber 38 and a second chamber 42. The diaphragm 40 has a first bead 44 retained between the front shell 32 and the rear shell 34 by the twist lock arrangement 36 and a second bead 46 located in groove 48 on hub 50. The hub 50 has a radial projection 52 which extends to adjacent the peripheral surface of the servomotor and forms a backing plate for diaphragm 40. The hub 50 has a cylindrical projection 54 which extends through axial opening 58 in the rear shell 34. The cylindrical projection 54 has a bore 60 therein connected to the first chamber 38 through a passage 62. The control valve 24 which is located in bore 60, regulates the communication of vacuum from the first passage 62 and air through the second passage 64 into the second chamber 42.

The control valve 24 includes a diaphragm 66 which has a first end 68 secured to the interior of the cylindrical projection 54 by retainer 70 and a second end 72 which is loosely retained in bore 60. A first spring 74, which surrounds the push rod 22, is located between a keeper 76 and the second end 72 of the diaphragm 66. The first spring 74 urges the second end 72 toward a vacuum seat 78 located between the first passage 62 and the second passage 64 in the hub 50. A second spring 80 is located between retainer 70 and keeper 76 to return the brake pedal 20 to a rest position. Movement of the pedal 20 toward the rest position causes plunger 82 to engage the second end 72 of the diaphragm 66 and compress the first spring 74 to allow vacuum communication between the first passage 62, bore 60 and the second passage 64.

The plunger 82 has a bearing surface 84 which is carried on land 86 of the hub 50 to maintain an atmospheric seat 88 on the end thereof in a position which is substantially parallel to the vacuum seat 78 in the hub 50. The land 86 also locates a reaction disc 90 in bore 60 adjacent a cylindrical member 92. The cylindrical member 92 has a groove 94 on the peripheral surface 96 adjacent the end 98 of the hub 50 to retain a rectangular member 100 which radially projects therefrom. The rectangular member 100 transmits the output force from the wall 26 into the lever arrangement 28.

The lever arrangement 28 has first and second arms 102 and 104 (see FIG. 2). Each of the first and second arms 102 and 104 are fixed to the end plug 106 of the servomotor 12 by a pivot pin 108. The pivot pin 108 extends through holes 110 and 112 located in first and second ends 118 and 120, respectively to allow the first and second arms 102 and 104 to rotate. The first and second arms 102 and 104 have slots 114 and 116 located between the first ends 118 and 120 and second ends 122 and 124. the first arm 102 is separated from the second arm 104 by a brace 126. The first and second ends 122 and 124 guide end 128 of the rectangular projection 100 into engagement with the brace 126. A pivot pin 130 extends through the first and second slots 114 and 116 to connect the lever arrangement 28 with the output push rod 30.

The output push rod 30 has a blind bore 132 which extends from a first end 134 toward the center. The peripheral surface 96 of cylindrical member 92 telescopes into the blind bore 132 to provide a guide surface for spring 136. A return spring (not shown) in the master cylinder 14 acts on the output push rod 30 to urge brace 126 into constant engagement with end 128 of the rectangular projection 100 to prevent any loss in motion through movement of the wall 26 by a pressure differential between vacuum in chamber 38 and air in chamber 42. However, should a malfunction occur in the production of vacuum, the operator input force applied to push rod 22 is directly transmitted to push rod 30 as spring 136 is overcome and surface 96 engages end 134.

MODE OF OPERATION OF THE INVENTION

When a vehicle which has an internal combustion engine is operating, vacuum is produced at the intake manifold. The intake manifold in connected to the front shell 32 through conduit 37. A check valve 39 located in conduit 37 provides one-way communication of air from the first chamber 38 to allow vacuum produced at the intake manifold to evacuate air from the interior of the servomotor 12. As shown in FIG. 1, the return spring 80 urges the atmospheric seat 88 on the plunger 82 against the second end 72 of the diaphragm to allow free communication of air between the first chamber 38 and the second chamber 42 through the first passage 62, bore 60 and second passage 64.

When an operator desires to effect a brake application, an input force is applied to pedal 20. The input force applied to pad 21 is multiplied by the ratio of the distance from pad 21 to pivot pin 23 to the distance from connection pin 25 to the pivot pin 23. Typically, a 4:1 ratio is used to multiply the operator input force applied pad 21 for transmission into push rod 22. The input force applied to pad 21, rotates pedal 20 about pin 23 and linearly moves push rod 22. Movement of push rod 22 sequentially allows spring 74 to seat the second end 72 of diaphragm 66 on the vacuum seat 78 to interrupt communication of vacuum between the first chamber 38 and the second chamber 42 through the first passage 62, and thereafter permits air to flow past the atmospheric seat 88 into the second chamber 42 from bore 60 through the second passage 64. With air in the second chamber 42 and vacuum in the first chamber 38, a pressure differential is created across wall 26. The pressure differential acts on diaphragm 40 and backing plate 52 to create an output force which moves the wall 26 toward the first chamber 32 in opposition to return spring 80. The output force developed across the wall 26 is communicated into the cylindrical member 92 through land 86 acting on the reaction disc 90. The output force in the cylindrical member 92 is transmitted through the rectangular member 100 into brace 126 of the lever arrangement 28. The output force applied to the brace 126 causes the lever arrangement 28 to rotate about pin 108 and transmit an operational force through pin 130 into the output push rod 30. Movement of push rod 30 operates the master cylinder 14 which supplies the wheel brakes of the vehicle with an operational force. As the lever arrangement 28 rotates about pin 108, the pivot pin 130 moves in slots 114 and 116 to vary the multiplication ratio of the output force to the operational force as a function of the distance from brace 126 to pin 108 to between the bottom 117 and 117' and top 119 and 119' of slots 114 and 116 in the first and second arm members 102 and 104. Thus, the output force from the movable wall 26, as modified by a multiplication ratio if the lever arrangement 28 provides an operational force which can activate the master cylinder 14 and operate the brake system in a manner acceptable to meet current brake safety standards.

When the operator input force is terminated, return spring 80 urges atmospheric face 88 against the second face 72 to interrupt the communication of air into the second chamber 42 through the second passage 64 and thereafter moves the second face 72 away from the vacuum seat 78 to allow vacuum present in the first chamber 38 to evacuate air from the second chamber 42 and terminate the pressure differential across wall 26. As the pressure differential is reduced, return spring 51 urges the wall 26 toward the second chamber 42. When the pressure differential is completely eliminated, the wall 26 engages the rear shell 34.

Should a malfunction occur whereby the vacuum in the first chamber 38 is eliminated, the operator is required to manually activate the master cylinder 14. The lever ratio of pedal 20 and the internal multiplication of lever arrangement 28 permits the brake system to operate in a manner acceptable to meet current safety standards.

In the servomotor embodiments shown in FIGS. 3 and 4, where the components are identical to those of FIG. 1, the same identification numerals are used. The only difference between FIGS. 3 and 1 resides in the scissors-like lever 27.

The scissors-like lever 27 includes first and second arm members 28 and 228. The scissors-like lever 27 has a first lever member 202 and a second lever member (not shown) each of which has a slot through which pivot pin 130 extends for joining the first arm member 28 to the second arm member 228. The second lever member 228 has a first end 218 with a hole 210 through which pin 208 extends to the end plug or wall 106 of the servomotor 12. The first lever member 202 of the second arm member 228 is separated from the second lever member by a brace 226. The brace 226 rests against the face 129 of the projection member 100 which extends from the force transfer body member 92.

In operation, the output force from the movable wall 26 is transmitted through the cylindrical member 92 and into the first and second arm members 28 and 228 through the radial projection member 100. The output force acts on both braces 126 and 226 causing their associated lever members to rotate about the fixed pivot pins 108 and 208, respectively, and transmit an operational force to the push rod 30 through pivot pin 130. Through the use of the scissors-like lever 27, the radial components of the arcuate movement associated with the rotation of the arm members 28 and 228 about their fixed pivot pins 108 and 208, respectively, cancel each other and the operational force transmitted to push rod means 30 is substantially a direct axial force. In the servomotor embodiment 312 illustrated in FIG. 4, the control valve 356 is attached to the fulcrum point on the lever 328 and the push rod 30 is a direct extension of the push rod 22 attached to pedal 20.

In more particular detail, the servomotor 312 has a first shell 32 joined to second shell 34 by a twist lock connection 36. A diaphragm 40 of the wall 26 separates the interior of the servomotor 312 into a first chamber 38 and a second chamber 42. The diaphragm 40 is connected to hub 50 which is associated with backing plate 52. The hub 50 has an axial projection 54 which extends through an opening 58 in the rear shell 34. The axial projection 54 has a bore 60 therein for retaining the control valve 356.

The control valve 356 includes a diaphragm 66 with a first end 68 secured to the interior of a bore 60 by a retainer 70. The retainer 70 has a cap 71 with a plurality of holes 73 located therein for allowing air to be communicated into bore 60 without any substantial interference. A filter 75 is located adjacent the cap 71 to prevent contaminants from being communicated to the control valve 356. A spring 74 which rests against cap 71 urges the second end 72 of the diaphragm 66 toward the vacuum seat 78 on hub 50 and toward the atmospheric seat 88 on the plunger 82. The plunger 82 has a stem 83 which extends through the hub 50 into engagement with the cylindrical member 92. The cylindrical member 92 has a pivot pin 100 which establishes a fulcrum for the lever 328.

The lever 328 which is similar to the lever arrangement 28 in FIG. 1, has a first arm member 302 with a first end 318 fixed to pivot pin 308 and a second end 322. The second end 322 has a first slot 314 located therein for engagement with pivot pin 330 on push rod 30 and a second slot 315 for attaching the lever 328 to the cylindrical member 92 by pivot pin 100. The first arm member 302 is connected to a second arm member by braces 325 and 326.

The pivot pin 308 is resiliently positioned against the first shell 32 by the retention force of spring 311 which is held between keeper 313 and face 319 on the stem 318 which carries pin 308.

The operation of servomotor 312 is as follows. The operator applies a manual input to the brake pedal 20 which moves push rod 22. The push rod 22 supplies the master cylinder 14 with a manual input force sufficient to move the piston therein (not shown) past the compensator ports contained therein. The initial movement of push rod 22 causes the lever 328 to pivot around pin 308 and move plunger 82 away from the second end 72 of the diaphragm 66. However, spring 74 seats the second end 72 on the vacuum seat prior to any communication of air from bore 60 into the second chamber 42 through the second passage 64. The closing of the compensator ports in the master cylinder and the opening of the atmospheric communication passage 64 between the second end 72 and seat 78 on the plunger 82 are designed to occur simultaneously. When air is allowed to be communicated from bore 60 into the second chamber 42, a pressure differential is created across the wall 26. The pressure differential causes the wall 26 to move toward the first chamber 38 and transmit an output force to the lever 328 through engagement of pin 100 with the arm member 302 surrounding slots 315. The output force causes the lever 328 to pivot around pin 308 and move end 322 with a force which is equal to the output force of the movable wall multiplied by the ratio of the distance from pin 330 to 308 divided by the distance from pin 100 to pin 308 to provide the push rod 30 with an operational force for operating the master cylinder 14.

When the input force terminates, a return spring (not shown) in the master cylinder 14 acts through push rods 30 and 22 to return the pedal 20 to a rest position. As the push rod 30 moves toward the rear shell 34, pin 330 moves pin 100 toward the control valve 356 to sequentially bring the atmospheric seat 78 into engagement with the second face 72 of the diaphragm 66 to terminate the communication of air from bore 60 into the second chamber 42 through the second passage 64. Thereafter, the second face 72 is moved away from the vacuum seat 78 to allow vacuum to evacuate air from the second chamber 42 by flowing through the first passage 62 into the first chamber 38 to reduce and eventually eliminate the operational pressure differential across wall 26. When this pressure differential is eliminated, a return spring (not shown) moves the wall 26 to a rest position against the second shell 34.

Should a malfunction occur in the vehicle whereby the development of vacuum at the intake manifold is eliminated, an operator is required to manually activate the master cylinder 14. If an input force is applied to push rod 22 in this situation, pivot pin 330 moves lever arm 328 about pivot pin 308 until shoulder 382 associated with plunger 82 engages the hub 50. Thereafter, the input force causes spring 311 to collapse and permits the lever arm 328 to pivot about pin 100. When the lever arm 328 pivots about pin 100, the wall 26 remains stationary to permit the manual input force applied to push rod 24 to be directly transmitted to the master cylinder. Thus, this invention permits the operator to manually supply a master cylinder 14 with an operational input sufficient to meet the currently acceptable braking standards.

I claim:
1. A servomotor comprising:
a housing having a cavity therein;
wall means for dividing said cavity into a first chamber and a second chamber, said first and second chambers being connected to a source of vacuum;
valve means in said wall means for interrupting the communication of vacuum to said second chamber and allowing an operational fluid to be communicated to said second chamber to produce a pressure differential across said wall means;
an input push rod member responsive to an operator force for moving said valve means to develop said pressure differential, said pressure differential causing said wall means to move and develop an output force;
a cylindrical member connected to wall means and engaging said valve means;
a radial projection member attached to said cylindrical member;
an output push rod member extending from said housing for supplying a mechanism with an operational force, said push rod having a bore therein, said cylindrical member extending into said bore;
a first pivot pin attached to said output push rod member; and
lever means having first and second arm members, each of said first and second arm members having a first end and a second end, each of said first ends being pivotally attached to said housing, said first arm member and said second arm member each having a first slot therein, said first pivot pin extending through the first slot in each of the first and second arms, a first brace member attached to said first and second arm adjacent said second end for separating said first arm from said second arm member, said radial projection engaging and transferring said output force into said brace member causing said first and second arm member to pivot about said first end and transmit a modified output force to said output push rod through said first pivot pin, said first slot in each of the first and second arms permitting said first and second arm members to rotate about said first ends while allowing said output push rod member to move linearly.

2. The servomotor as recited in claim 1 wherein said cylindrical member transmits the operator input force directly into said output push rods from the input push rod in the absence of a pressure differential across said wall.

* * * * *